United States Patent
Kitamura et al.

(10) Patent No.: US 8,749,154 B2
(45) Date of Patent: Jun. 10, 2014

(54) SWITCHING POWER SUPPLY, LUMINAIRE, AND CONTROL METHOD FOR THE LUMINAIRE

(75) Inventors: Noriyuki Kitamura, Kanagawa-ken (JP); Yuji Takahashi, Kanagawa-ken (JP)

(73) Assignee: Toshiba Lighting & Technology Corporation, Yokosuka-shi, Kanagawa-ken (JP)

( * ) Notice: Subject to any disclaimer, the term of this patent is extended or adjusted under 35 U.S.C. 154(b) by 126 days.

(21) Appl. No.: 13/565,546

(22) Filed: Aug. 2, 2012

(65) Prior Publication Data

US 2013/0069551 A1    Mar. 21, 2013

(30) Foreign Application Priority Data

Sep. 21, 2011  (JP) ................................. 2011-206456

(51) Int. Cl.
*H05B 37/02*    (2006.01)
(52) U.S. Cl.
USPC ................... 315/209 R; 315/200 R; 315/276; 315/291
(58) Field of Classification Search
None
See application file for complete search history.

(56) References Cited

U.S. PATENT DOCUMENTS

| 7,514,878 | B2 * | 4/2009 | Crandall et al. | 315/224 |
| 7,800,317 | B2 * | 9/2010 | Kimura | 315/307 |
| 8,013,542 | B2 * | 9/2011 | Endres | 315/307 |
| 8,049,430 | B2 * | 11/2011 | Newman et al. | 315/224 |
| 8,232,734 | B2 * | 7/2012 | Newman et al. | 315/224 |
| 2006/0164023 | A1 * | 7/2006 | Siessegger | 315/274 |
| 2007/0114952 | A1 * | 5/2007 | Yang | 315/307 |

FOREIGN PATENT DOCUMENTS

JP        08-045680 A    2/1996

* cited by examiner

*Primary Examiner* — Jany Richardson
(74) *Attorney, Agent, or Firm* — Banner & Witcoff, Ltd.

(57) ABSTRACT

A switching power supply includes a transformer, a resonant capacitor, a pair of switching elements, an inductor, and a rectifying element. The transformer includes a first winding, a second winding, and a third winding. The resonant capacitor is connected to both ends of the first winding. The switching elements are normally-on elements and alternately turned off according to a voltage induced in the third winding. Each of the switching elements includes a first main terminal, a second main terminal, and a control terminal. The inductor supplies a direct-current power supply voltage between the middle point of the first winding and the each first main terminal of the switching elements. The rectifying element rectify a voltage induced in the second winding.

20 Claims, 1 Drawing Sheet

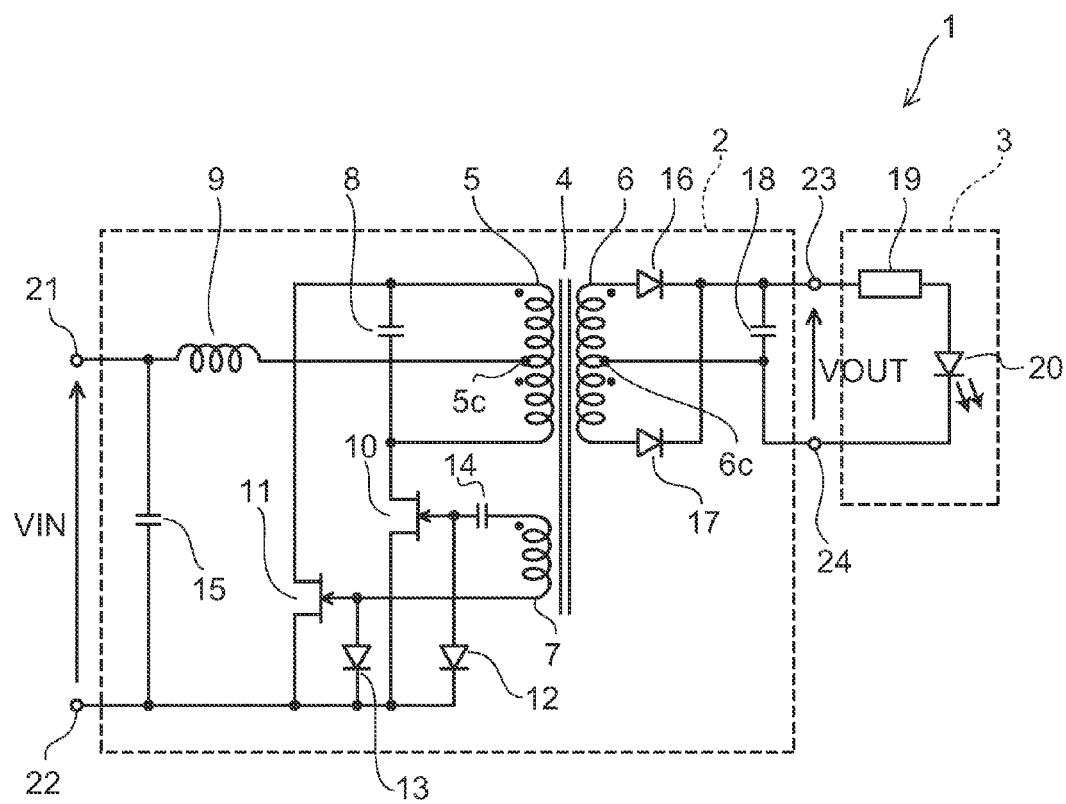

SWITCHING POWER SUPPLY, LUMINAIRE, AND CONTROL METHOD FOR THE LUMINAIRE

CROSS-REFERENCE TO RELATED APPLICATIONS

This application is based upon and claims the benefit of priority from the prior Japanese Patent Application No.2011-206456, filed on Sep. 21, 2011; the entire contents of which are incorporated herein by reference.

FIELD

Embodiments described herein relate generally to a switching power supply, a luminaire, and a control method for the luminaire.

BACKGROUND

A switching power supply including a switching element is used in a wide variety of applications as a direct-current or alternating-current power supply. As an example, the switching power supply is used as a power supply for lighting. Specifically, in recent years, in a luminaire, more and more illumination light sources are changed from an incandescent lamp and a fluorescent lamp to energy-saving and long-life light sources such as a light-emitting diode (LED). For example, new illumination light sources such as an electroluminescence (EL) and an organic light-emitting diode (OLED) have been developed. The light output of these illumination light sources depends on a value of a flowing electric current. Therefore, when lighting is lit, a power supply circuit that supplies a constant current is necessary. Further, in order to adjust an input power supply voltage to a rated voltage of an illumination light source such as an LED, it is also necessary to convert the voltage. As a highly-efficient light source suitable for power saving and a reduction in size, a switching power supply such as a DC-DC converter is known. A discharge lighting circuit of a current push-pull type that can suppress a ripple component of an input current and obtain a high rising voltage ratio is proposed (see, for example, JP-A-08-045680).

However, in a DC-DC converter of the current push-pull type, it is necessary to control a pair of switching elements not to be simultaneously turned off. If the switching elements are caused to oscillate in a self-excited manner, complicated control is necessary.

BRIEF DESCRIPTION OF THE DRAWINGS

FIG. 1 is a circuit diagram of a luminaire including a switching power supply according to an exemplary embodiment.

DETAILED DESCRIPTION

First Embodiment

A first embodiment is directed to a switching power supply including a transformer, a resonant capacitor, a pair of switching elements, an inductor, and a rectifying element. The transformer includes a first winding, a second winding, and a third winding. The resonant capacitor is connected to both ends of the first winding. The switching elements are normally-on type elements and alternately turned off according to a voltage induced in the third winding. Each of the switching elements includes a first main terminal, a second main terminal, and a control terminal. The first main terminal of one of the switching elements is connected to the first main terminal of one other of the switching elements. The second main terminal of the one of the switching elements is connected to one end of the first winding. The second main terminal of the one other of the switching elements is connected to one other end of the first winding. The control terminal of the one of the switching elements is connected to one end of the third winding. The control terminal of the one other of the switching elements is connected to one other end of the third winding. The inductor supplies a direct-current power supply voltage between the middle point of the first winding and the each first main terminal of the switching elements. The rectifying element rectifies a voltage induced in the second winding.

Second Embodiment

A second embodiment is directed to the switching power supply according to the first embodiment, wherein the control terminal of at least one of the switching elements is connected to the third winding via a coupling capacitor.

Third Embodiment

A third embodiment is directed to the switching power supply according to the first or second embodiment wherein the switching power supply further includes a pair of diodes, anodes of which are respectively connected to the control terminals of the switching elements and cathodes of which are respectively connected to the first main terminals of the switching elements.

Fourth Embodiment

A fourth embodiment is directed to the switching power supply according to any one of the first to third embodiment, wherein the switching elements are wide bandgap semiconductor elements.

Fifth Embodiment

A fifth embodiment is directed to a luminaire including the switching power supply according to any one of the first to fourth embodiment and a lighting load connected as a load circuit of the switching power supply.

An exemplary embodiment is explained in detail below with reference to the accompanying drawings. In this specification and the drawings, components same as those already explained with reference to the drawings are denoted by the same reference numerals and signs and detailed explanation of the components is omitted as appropriate.

FIG. 1 is a circuit diagram of a luminaire including a switching power supply according to an exemplary embodiment.

As shown in FIG. 1, a luminaire 1 includes a switching power supply 2 that drops an input direct-current power supply voltage VIN to a direct-current voltage VOUT and a lighting load 3 functioning as a load circuit of the switching power supply 2. The lighting load 3 includes an illumination light source 20 including, for example, an LED. The lighting load 3 receives the supply of the voltage VOUT from the switching power supply 2 to be lit.

The switching power supply 2 includes a transformer 4, a resonant capacitor 8 that configures a resonant circuit in conjunction with the transformer 4, an inductor 9 that supplies the power supply voltage VIN to the transformer 4, a pair of switching elements 10 and 11 that control an electric current flowing to the transformer 4, and rectifying elements 16 and 17 that rectify an alternating-current voltage induced in the transformer 4 into a direct-current voltage.

The transformer 4 includes a first winding 5, a second winding 6, and a third winding 7. A center tap (a middle point) 5c is provided in the first winding 5. A center tap (a middle point) 6c is provided in the second winding 6.

The resonant capacitor 8 is connected to both ends of the first winding 5. The resonant capacitor 8 configures the resonant circuit in conjunction with the transformer 4. The resonant capacitor 8 resonates at a resonant frequency specified by inductance nearly equal to the inductance of the first winding 5 and capacitance nearly equal to the capacitance of the resonant capacitor 8.

The inductor 9 is connected between a high-potential power supply terminal 21 and the middle point 5c of the first winding 5. The inductor 9 supplies the direct-current power supply voltage VIN to the first winding 5. The inductance of the inductor 9 is set sufficiently larger than the inductance of the first winding 5. The inductance of the inductor 9 does not affect the resonant frequency.

The pair of switching elements 10 and 11 are connected in series between both the ends of the first winding 5. Specifically, a source, which is a first terminal, of the switching element 10 and a source, which is a first terminal, of the switching element 11 are connected to each other and connected to a low-potential power supply terminal 22. A drain, which is a second terminal, of the switching element 10 is connected to one end of the first winding 5. A drain, which is a second terminal, of the switching element 11 is connected to the other end of the first winding 5. A gate, which is a control terminal, of the switching element 10 is connected to one end of the third winding 7 via a coupling capacitor 14. A gate, which is a control terminal, of the switching element 11 is connected to the other end of the third winding 7. A voltage induced at both the ends of the third winding 7 is supplied to the gates of the pair of switching elements 10 and 11. The pair of switching elements 10 and 11 are normally-on elements and are, for example, field effect transistors (FETs) such as high electron mobility transistors (HEMTs).

A diode 12 is connected between the gate of the switching element 10 and the low-potential power supply terminal 22. The diode 12 protects the gate of the switching element 10 from a surge voltage generated in the third winding 7. A diode 13 is connected between the gate of the switching element 11 and the low-potential power supply terminal 22. The diode 13 protects the gate of the switching element 11 from a surge voltage generated in the third winding 7.

The capacitor 15 is connected between the high-potential power supply terminal 21 and the low-potential power supply terminal 22. The capacitor 15 removes high-frequency noise.

The rectifying elements 16 and 17 are respectively connected between both the ends of the second winding 6 and a high-potential output terminal 23. Specifically, anodes of the rectifying elements 16 and 17 are respectively connected to both the ends of the second winding 6. Cathodes of the rectifying elements 16 and 17 are connected to each other and connected to the high-potential output terminal 23. The middle point 6c of the second winding 6 is connected to a low-potential output terminal 24. The rectifying elements 16 and 17 rectify a voltage induced in the second winding 6. The rectifying elements 16 and 17 are, for example, diodes.

The smoothing capacitor 18 is connected between the cathodes of the rectifying elements 16 and 17 and the middle point 6c of the second winding 6. In other words, the smoothing capacitor 18 is connected between the high-potential output terminal 23 and the low-potential output terminal 24. The smoothing capacitor 18 smoothes the direct-current output VOUT.

The lighting load 3 includes the illumination light source 20 connected between the high-potential output terminal 23 and the low-potential output terminal 24 via a driving circuit 19. The driving circuit 19 is an impedance element such as a resistor and is, for example, a constant current element. The driving circuit 19 limits an electric current flowing to the illumination light source 20 and protects the illumination light source 20 from destruction by an overcurrent. The illumination light source 20 is, for example, an LED.

The operation of the switching power supply 2 is explained.

During power-on, when the power supply voltage VIN is supplied between the high-potential power supply terminal 21 and the low-potential power supply terminal 22, since the pair of switching elements 10 and 11 are the normally-on elements, both of the switching elements 10 and 11 are on. As a result, an electric current flows through a route of the high-potential power supply terminal 21, the inductor 9, the first winding 5, the switching element 10, and the low-potential power supply terminal 22 and a route of the high-potential power supply terminal 21, the inductor 9, the first winding 5, the switching element 11, and the low-potential power supply terminal 22.

Fluctuation occurs in the magnitudes of electric currents respectively flowing through the switching elements 10 and 11 according to, for example, a difference between threshold voltages of the switching elements 10 and 11. One current value is larger than the other. For example, if the electric current flowing through the switching element 10 is larger than the electric current flowing through the switching element 11, an excitation current equal to a current difference between the electric currents flowing through the switching elements 10 and 11 flows. Voltages are induced in the second winding 6 and the third winding 7.

A voltage positive with respect to the source of the switching element 10 is supplied to the gate of the switching element 10. The electric current of the switching element 10 increases. On the other hand, a voltage negative with respect to the source of the switching element 11 is supplied to the gate of the switching element 11. The electric current of the switching element 11 decreases. According to this positive feedback, the switching element 11 is turned off.

If the switching element 10 is turned on and the switching element 11 is turned off, the electric current flows through a route of the high-potential power supply terminal 21, the inductor 9, the first winding 5, the switching element 10, and the low-potential power supply terminal 22. Since the switching element 11 is off, the first winding 5 resonates with the resonant capacitor 8. Resonant voltages are induced in the second winding 6 and the third winding 7.

The rectifying element 16 rectifies the voltage induced in the second winding 6 and charges the smoothing capacitor 18. The voltage at both ends of the smoothing capacitor 18, i.e., the direct-current voltage VOUT between the high-potential output terminal 23 and the low-potential output terminal 24 is supplied to the illumination light source 20 of the lighting load 3 as an output voltage of the switching power supply 2. The electric current does not flow to the illumination light source 20 until the direct-current voltage VOUT reaches a predetermined voltage. For example, if the illumination light source 20 is an LED, the predetermined voltage is a forward direction voltage of the LED and is set according to the illumination light source 20.

If the phase of the voltage induced in the third winding 7 changes as time elapses and the gate-to-source voltage of the switching element 10 changes from a positive voltage to a negative voltage, the switching element 10 is turned off. If the gate-to-source voltage of the switching element 11 changes from a negative voltage to a positive voltage, the switching element 11 is turned on.

If the switching element 10 is turned off and the switching element 11 is turned on, the electric current flows through a route of the high-potential power supply terminal 21, the inductor 9, the first winding 5, the switching element 11, and the low-potential power supply terminal 22. Resonant voltages induced in the second winding 6 and the third winding 7 have polarities opposite to the polarities of resonant voltages induced when the switching element 10 is on and the switching element 11 is off. As a result, continuous resonant voltages are induced in the second winding 6 and the third winding 7.

The rectifying element 17 rectifies the voltage induced in the second winding 6 and charges the smoothing capacitor 18. The direct-current voltage VOUT is supplied to the illumination light source 20 of the lighting load 3. If the direct-current voltage VOUT is equal to or higher than the predetermined voltage, the electric current flows to the illumination light source 20 and the illumination light source is lit.

Further, if the phase of the voltage induced in the third winding 7 changes and the gate-to-source voltage of the switching element 10 changes from a negative voltage to a positive voltage, the switching element 10 is turned on. If the gate-to-source voltage of the switching element 11 changes from a positive voltage to a negative voltage, the switching element 11 is turned off. Consequently, the switching power supply 2 returns to the state after the power-on.

Thereafter, switching to on and off of the pair of switching elements 10 and 11 is automatically repeated. As a result, the direct-current voltage VOUT generated from the power supply voltage VIN is supplied to the illumination lighting source 20. The illumination light source 20 can be stably lit.

Since the pair of switching elements 10 and 11 are the normally-on elements, when the pair of switching elements 10 and 11 are switched to on and off according to a resonant voltage having a sine waveform induced in the third winding 7, there is a period in which both the switching elements 10 and 11 are on. As a result, it is possible to secure a period in which energy is accumulated in the inductor 9 necessary in the switching power supply of the current push-pull type.

Effects of this embodiment are explained.

In this embodiment, since the pair of switching elements 10 and 11 of the normally-on type is caused to oscillate in a self-excited manner, a start-up circuit is unnecessary. If a low-resistant start-up resistor is used as the start-up circuit, a loss occurs. However, in this embodiment, since the start-up resistor is unnecessary, the loss can be reduced. Further, it is possible to configure, with a simple configuration, the switching power supply of the current push-pull type by providing a period in which the switching elements are simultaneously turned on.

In this embodiment, since the pair of switching elements 10 and 11 are the normally-on elements, when the pair of switching elements 10 and 11 are switched to on and off according to the resonant voltage having the sine waveform induced in the third winding 7, the period in which both the switching elements 10 and 11 are turned on is easily formed. As a result, it is possible to secure a period in which energy is accumulated in the inductor 9 necessary in the switching power supply of the current push-pull type.

Further, if HEMTs are used as the pair of switching elements 10 and 11, a high-frequency operation is possible. For example, an operation in megahertz order is possible. In particular, if GaNHEMTs are used, a higher-frequency operation is possible and a transformer can be reduced in size.

The embodiment is explained with reference to the specific examples. However, the present invention is not limited to the embodiment and various modifications are possible.

For example, the configuration of the switching power supply is not limited to the configuration shown in FIG. 1. For example, the inductor 9 only has to be capable of supplying the direct-current power supply voltage VIN between the middle point 5c of the first winding 5 and the sources of the switching elements 10 and 11. The inductor 9 may be connected between the low-potential power supply terminal 22 and the sources of the switching elements 10 and 11.

For example, a middle point may be provided in the third winding 7. The control terminals of the pair of switching elements 10 and 11 may be respectively connected to both the ends of the third winding 7. The middle point of the third winding 7 may be connected to the low-potential power supply terminal 22.

The switching elements 10 and 11 are not limited to the GaN HEMTs. For example, the switching elements 10 and 11 may be semiconductor elements formed on a semiconductor substrate using a semiconductor having a wide bandgap (a wide bandgap semiconductor) such as silicon carbonate (SiC), gallium nitride (GaN), or diamond. The wide bandgap semiconductor means a semiconductor having a bandgap wider than the bandgap of gallium arsenide (GaAs) having a bandgap of about 1.4 eV. For example, the wide bandgap semiconductor includes semiconductors having bandgaps equal to or larger than 1.5 eV such as gallium phosphide (GaP, having a bandgap of about 2.3 eV), gallium nitride (GaN, having a bandgap of about 3.4 eV), diamond (C, having a bandgap of about 5.27 eV), aluminum nitride (AlN, having a bandgap of about 5.9 eV), and silicon carbide (SiC). Such a wide bandgap semiconductor can be caused to operate at high speed by reducing parasitic capacitance. Therefore, it is possible to further reduce the size of the transformer and reduce the size of the switching power supply.

In the example explained above, the configuration in which the rectifying elements 16 and 17 are connected to the middle point 6c of the second winding 6 to perform full-wave rectification is explained. However, the middle point 6c does not have to be provided in the second winding 6. A bridge rectifying circuit may be configured.

Further, the illumination light source 20 is not limited to the LED and may be an EL or an OLED. Plural illumination light sources 20 may be connected to the lighting load 3 in series or in parallel.

In the example explained in the embodiment, the illumination light source is used as the load of the switching power supply. However, the switching power supply is not limited to the illumination light source. A load driven by a direct current can be used.

While certain embodiments have been described, these embodiments have been presented by way of example only, and are not intended to limit the scope of the inventions. Indeed, the novel embodiments described herein may be embodied in a variety of other forms; furthermore, various omissions, substitutions, and changes in the form of the embodiments described herein may be made without departing from the spirit of the inventions. The accompanying claims and their equivalents are intended to cover such forms or modifications as would fall within the scope and spirit of the inventions.

What is claimed is:

1. A switching power supply comprising:
   a transformer including a first winding, a second winding, and a third winding;
   a resonant capacitor connected to both ends of the first winding;
   a pair of switching elements being normally-on type elements and alternately turned off according to a voltage induced in the third winding, each of the switching elements including a first main terminal, a second main terminal, and a control terminal, the first main terminal of one of the switching elements being connected to the first main terminal of one other of the switching elements, the second main terminal of the one of the switching elements being connected to one end of the first winding, the second main terminal of the one other of the switching elements being connected to one other end of the first winding, the control terminal of the one of the switching elements being connected to one end of the third winding, the control terminal of the one other of the switching elements being connected to one other end of the third winding;

an inductor configured to supply a direct-current power supply voltage between a middle point of the first winding and the each first main terminal of the switching elements; and rectifying element configured to rectify a voltage induced in the second winding.

2. The switching power supply according to claim 1, wherein the control terminal of at least one of the switching elements is connected to the third winding via a coupling capacitor.

3. The switching power supply according to claim 1, further comprising a pair of diodes, anodes of which are respectively connected to the control terminals of the switching elements and cathodes of which are respectively connected to the first main terminals of the switching elements.

4. The switching power supply according to claim 1, wherein the switching elements are wide bandgap semiconductor elements.

5. The switching power supply according to claim 1, wherein inductance of the inductor is larger than inductance of the first winding.

6. The switching power supply according to claim 1, further comprising a capacitor connected between the inductor and the each first main terminal of the switching elements.

7. The switching power supply according to claim 1, further comprising a smoothing capacitor connected to the rectifying element.

8. A luminaire comprising:
a switching power supply; and
a lighting load connected as a load circuit of the switching power supply,
the switching power supply including:
  a transformer including a first winding, a second winding, and a third winding;
  a resonant capacitor connected to both ends of the first winding;
  a pair of switching elements being normally-on type elements and alternately turned off according to a voltage induced in the third winding, each of the switching elements including a first main terminal, a second main terminal, and a control terminal, the first main terminal of one of the switching elements being connected to the first main terminal of one other of the switching elements, the second main terminal of the one of the switching elements being connected to one end of the first winding, the second main terminal of the one other of the switching elements being connected to one other end of the first winding, the control terminal of the one of the switching elements being connected to one end of the third winding, the control terminal of the one other of the switching elements being connected to one other end of the third winding;

an inductor configured to supply a direct-current power supply voltage between a middle point of the first winding and the each first main terminal of the switching elements; and rectifying element configured to rectify a voltage induced in the second winding.

9. The luminaire according to claim 8, wherein the control terminal of at least one of the switching elements is connected to the third winding via a coupling capacitor.

10. The luminaire according to claim 8, further comprising a pair of diodes, anodes of which are respectively connected to the control terminals of the switching elements and cathodes of which are respectively connected to the first main terminals of the switching elements.

11. The luminaire according to claim 8, wherein the switching elements are wide bandgap semiconductor elements.

12. The luminaire according to claim 8, wherein inductance of the inductor is larger than inductance of the first winding.

13. The luminaire according to claim 8, further comprising a capacitor connected between the inductor and the each first main terminal of the switching elements.

14. The luminaire according to claim 8, further comprising a smoothing capacitor connected to the rectifying element.

15. The luminaire according to claim 8, wherein the lighting load includes:
a driving circuit; and
an illumination light source connected to the switching power supply via the driving circuit.

16. The luminaire according to claim 15, wherein the driving circuit is a constant current element.

17. The luminaire according to claim 15, wherein the driving circuit is an impedance element.

18. A control method for a luminaire including a switching power supply of a current push-pull type configured to switch a pair of switching elements of a normally-on type connected between a direct-current power supply and a transformer to on and off and generate a sine wave voltage in the transformer and a lighting load connected as a load circuit of the switching power supply, the method comprising:

supplying a voltage induced in the transformer to control terminals of the switching elements and causing the switching elements to oscillate in a self-excited manner; and rectifying the voltage induced in the transformer and supplying a direct-current voltage to the lighting load.

19. The method according to claim 18, further comprising supplying the voltage induced in the transformer to the control terminals of the switching elements via a coupling capacitor.

20. The method according to claim 18, further comprising connecting a pair of diodes respectively to the control terminals of the switching elements.

* * * * *